(12) United States Patent
Wadsworth

(10) Patent No.: US 8,186,387 B2
(45) Date of Patent: May 29, 2012

(54) DUCT INSULATION MATERIAL AND METHOD OF USING

(75) Inventor: Robert L. Wadsworth, Crown Point, IN (US)

(73) Assignee: Innovative Energy, Inc., Lowell, IN (US)

( * ) Notice: Subject to any disclaimer, the term of this patent is extended or adjusted under 35 U.S.C. 154(b) by 979 days.

(21) Appl. No.: 12/125,628

(22) Filed: May 22, 2008

(65) Prior Publication Data

US 2009/0133347 A1    May 28, 2009

Related U.S. Application Data

(60) Provisional application No. 60/939,391, filed on May 22, 2007.

(51) Int. Cl.
*F16L 9/14* (2006.01)

(52) U.S. Cl. .................. 138/149; 138/143; 138/DIG. 4; 138/DIG. 10

(58) Field of Classification Search .................. 138/149, 138/141, 143, DIG. 4, DIG. 10
See application file for complete search history.

(56) References Cited

U.S. PATENT DOCUMENTS

| | | | |
|---|---|---|---|
| 4,101,700 A | 7/1978 | Ray, Jr. et al. | 428/131 |
| 4,275,099 A | 6/1981 | Dani | 428/31 |
| 4,310,587 A | 1/1982 | Beaupre | 442/31 |
| 4,353,766 A | 10/1982 | Dani | 156/233 |
| 4,467,863 A * | 8/1984 | Montana | 165/136 |
| 4,557,297 A * | 12/1985 | Montana | 138/141 |
| 5,035,941 A * | 7/1991 | Blackburn | 442/398 |
| 5,762,109 A * | 6/1998 | Matthews et al. | 138/149 |
| 6,148,867 A * | 11/2000 | Matthews et al. | 138/149 |
| 6,769,455 B2 | 8/2004 | Toas et al. | 138/149 |
| 6,953,512 B2 | 10/2005 | Cohen et al. | 156/248 |
| 7,140,396 B2 | 11/2006 | Mota et al. | 138/149 |
| 7,140,397 B2 | 11/2006 | Shaffer et al. | 138/149 |
| 7,220,470 B2 | 5/2007 | Toas et al. | 138/146 X |
| 7,222,645 B2 | 5/2007 | Shaffer et al. | 138/149 |
| 2006/0121099 A1* | 6/2006 | Solarek | 424/443 |

OTHER PUBLICATIONS

Western Nonwovens, Inc. Product Specifications; Product ID T4167-01.50; Product Name: 1.5 oz Innovative.
Material Safety Data Sheet, p. 1 of 6; MSDSL31015, Revised Oct. 26, 1997.

* cited by examiner

*Primary Examiner* — Patrick F Brinson
(74) *Attorney, Agent, or Firm* — Hartman & Hartman, P.C.; Gary M. Hartman; Domenica N.S. Hartman

(57) ABSTRACT

A flexible insulation material and method for using such an insulation material with an HVAC duct to provide noise suppression and thermal protection. The insulation material includes a lofted substrate and a facer sheet laminated thereto. The substrate contains nonwoven lofted fibers and the insulation material is attached to the duct such that a first surface of the substrate faces a wall surface of the duct and the facer sheet is on the opposite surface of the substrate. The facer sheet includes a polymeric film bonded to the substrate, a metallization layer on the polymeric film, and optionally a protective coating on the metallization layer. The insulation material can be used as an external duct wrap or an internal duct liner. In the former application, the insulation material preferably includes a second facer sheet on the first surface of the substrate.

19 Claims, 1 Drawing Sheet

DUCT INSULATION MATERIAL AND METHOD OF USING

CROSS REFERENCE TO RELATED APPLICATIONS

This application claims the benefit of U.S. Provisional Application No. 60/939,391, filed May 22, 2007, the contents of which are incorporated herein by reference.

BACKGROUND OF THE INVENTION

The present invention generally relates to materials suitable for use in heating, ventilating, and air-conditioning (HVAC) ducts. More particularly, the invention relates to an insulation material that can be used as an external duct wrap or an internal duct liner, and is capable of providing noise suppression, thermal protection and, if used as an internal duct liner, does not expose the airstream within the duct to harmful fibers.

With the advance in HVAC duct design, much larger ducts are required to move air from both hot and cold air sources. The movement of air through a large duct system can generate a significant level of noise, as well as a need for more effective thermal protection as compared to smaller ducts. For this reason, external duct wraps that surround the duct exterior and internal duct liners that line the interior surfaces of the duct have been proposed. Flexible wraps and liners containing fibrous insulation materials (e.g., fiberglass) have typically been the material of choice for meeting these challenges, though if used as a duct liner there can be a concern for harmful fibers becoming entrained in the airstream, especially in hospitals, nursing homes, and schools. Another approach that has been proposed is to use rigid or semirigid insulation board materials. While generally avoiding the risk of loose fibers, rigid board materials must typically be kerfed to enable the material to be shaped and sized for the particular duct.

BRIEF SUMMARY OF THE INVENTION

The present invention provides a flexible insulation material and a method for using such a insulation material with an HVAC duct to provide noise suppression and thermal protection. The insulation material can be used as an external duct wrap or an internal duct liner, and in the latter case does not expose the airstream within the duct to harmful fibers.

The flexible insulation material includes a lofted substrate and a facer sheet laminated to the substrate. The substrate contains nonwoven lofted fibers, and the flexible insulation material is attached to the duct such that a first surface of the substrate faces a wall surface of the duct. The facer sheet is laminated to a second surface of the substrate opposite the first surface thereof. The facer sheet includes a polymeric film, a metallization layer on the polymeric film, and optionally a corrosion-resistant protective coating on the metallization layer. The flexible insulation material is secured to the duct and provides thermal insulation and sound attenuation properties, and the nonwoven lofted fibers of the substrate are contained between the facer sheet and the wall surface of the duct.

The method of the invention entails securing the flexible insulation material described above to the duct described above as an external duct wrap or an internal duct liner to provide thermal insulation and sound attenuation properties.

A significant advantage of this invention is that the flexible insulation material can be installed within a duct as an internal duct liner, or installed outside the duct as an external duct wrap. If installed as an internal duct liner, the nonwoven lofted fibers of the substrate are contained between the facer sheet and the wall surface of the duct such that the nonwoven lofted fibers are prevented from being released from the flexible insulation material into the airstream within the duct. Furthermore, the polymer film and/or the metallization layer provide a very smooth surface that significantly reduces the generation of sound produced by the airstream moving through the duct. On the other hand, if the flexible insulation material is installed outside the duct as an external duct wrap, the metallization layer can be deposited to have a low emissivity that, preferably when protected by the protective coating, inhibits heat transfer between the duct and its surrounding environment.

Other objects and advantages of this invention will be better appreciated from the following detailed description.

BRIEF DESCRIPTION OF THE DRAWINGS AND ATTACHMENTS

DETAILED DESCRIPTION OF THE INVENTION

Figure 1:
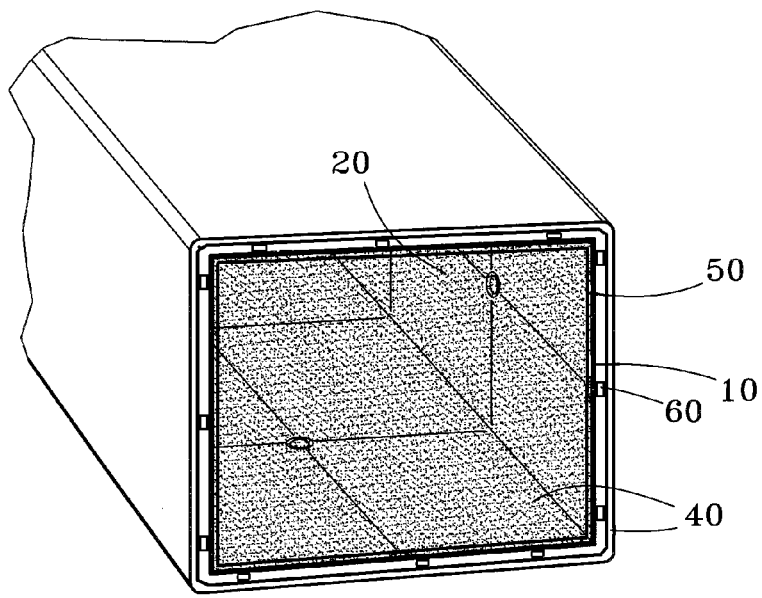
FIG. 1 is a perspective view of one end of an HVAC duct on which are installed, as an internal duct liner and as an external duct wrap, flexible insulation materials in accordance with a preferred aspect of the invention.

FIG. 1 shows flexible insulation materials 40 installed as both an internal duct liner within an airflow passage of an HVAC duct 10, and an external duct wrap surrounding the duct 10. Such a duct 10 is typically formed of sheet metal, though other materials are foreseeable. Furthermore, though the duct 10 is shown as having a square cross-section, other cross-sectional shapes are foreseeable. Because of their flexibility, the insulation materials 40 can be secured to internal and external walls of the duct 10 with an adhesive tape 50 of any suitable type, though other fastening methods and materials are also within the scope of the invention. The insulation material 40 used as the internal duct liner preferably uniformly contacts the internal wall surfaces of the duct 10, whereas the insulation material 40 used as the external duct wrap is represented as being spaced apart from the duct 10, for example, by about one to three centimeters, with spacers 60, creating a substantially continuous air gap between the insulation material 40 and the outer surface of the duct 10. This air gap, in combination with the construction of the insulation material 40 described below, is desirable to enable the duct wrap to meet thermal values of code requirements for duct wrap materials.

Figure 2:
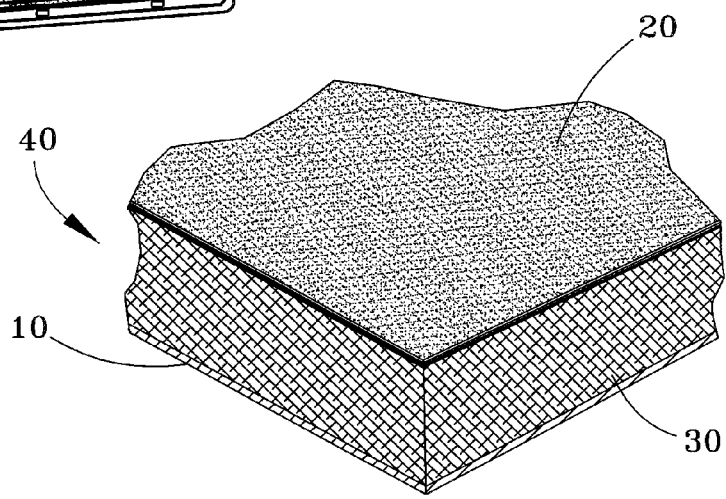
FIG. 2 represents a cross-sectional view of the internal duct liner of FIG. 1.

According to a preferred aspect of the invention, the insulation materials 40 can be, though are not required to be, identical. For convenience, the insulation material 40 used as the internal duct liner of FIG. 1 is shown and described with reference to FIGS. 2 and 3, though with the understanding that such description can and preferably does apply to the insulation material 40 employed as the external duct wrap, with potential differences noted when appropriate. As represented in FIG. 2, the insulation material 40 comprises a facer sheet 20 laminated to a substrate 30. The substrate 30 is preferably made up of nonwoven fibers lofted to a specific density to achieve the thermal R-value required for a given application. A particular example is a nonwoven lofted polyester (polyethylene terephthalate) fiber material commercially available from various manufacturing sources, including Western Nonwovens, Inc. The material produced by Western Nonwovens is a blend of recycled polyester staple fibers that contains about 10% of 0.95 Denier polyester fibers, about 30% of low melt polyester fibers, about 30% of 3 Denier polyester fibers, and about 30% of 6 Denier polyester fibers. The preferred example has a basis weight of about 1.5±10% ounces per square foot (about 4 g/m$^2$). Different proportions of other types of fibers are also foreseeable, for example, cotton fibers produced from shredded denim and commonly known as "shoddy" can also be used as the nonwoven lofted fiber material for the substrate 30. Suitable thicknesses for the substrate 30 will vary depending on the particular application and thermal performance required of the insulation material 40, though a thickness of about one inch (about 25 mm) or more is generally believed to be preferred for large HVAC ducts.

Figure 3:
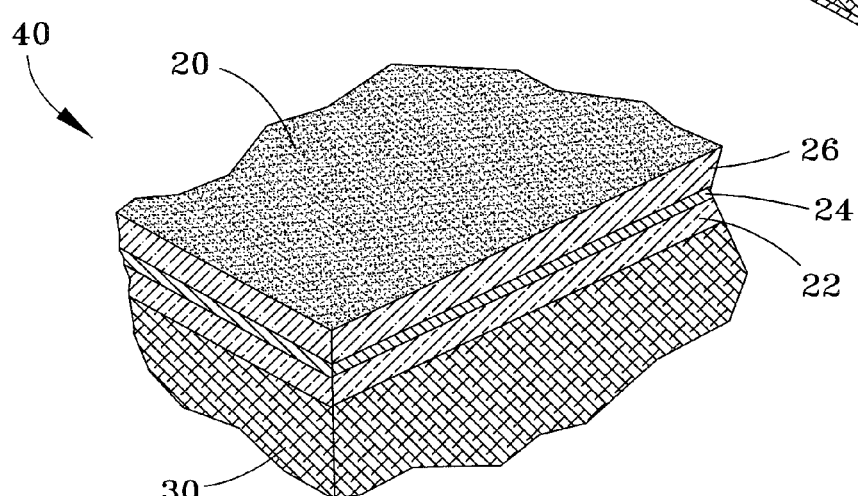
FIG. 3 represents a cross-sectional view of a facer sheet of the internal duct liner of FIG. 2.

The facer sheet 20 is formed to have at least one metallized film, optionally protected with a corrosion-resistant protective coating. These layers of the facer sheet 20 are represented in FIG. 3 as a polymeric film 22, a metallization layer 24 on the film 22, and a protective coating 26. The material for the film 22 is preferably polyester (polyethylene terephthalate) or another suitable facing material capable of meeting the conditions of code compliance for the specific application. Suitable nominal thicknesses for the film 22, metallization layer 24, and protective coating 26 are believed to be about 42 to about 48 gauge, though such thicknesses can vary. The protective coating 26 is useful to inhibit corrosion of the metallization layer 24, which is particularly desirable if the metallization layer 24 defines the outer exposed surface of the insulation material 40 as represented in FIG. 3. For example, as an external duct wrap, the insulation material 40 exhibits improved thermal performance if its outer surface reflects thermal radiation from the surrounding environment as a result of being defined by the metallization layer 24. Still further improvements can be achieved if the inner surface of the material 40 (facing the duct 10) is defined by an additional facer sheet (not shown) with a metallization layer as described for the facer sheet 20, and this additional metallization layer is spaced apart from the duct 10 as shown in FIG. 1 to enable thermal radiation emitted from the duct 10 to be reflected back to the duct 10. Finally, the thermal performance of a duct wrap formed of such an insulation material 40 is promoted if one or both metallization layers 24 exhibit low emissivity (0.05 or less), and the protective coating 26 is present to inhibit corrosion of each layer 24 to maintain the high reflectance of the facer sheet 20. A commercial example of a facer sheet 20 having the construction shown in FIG. 3 is manufactured by the Dunmore Corporation (Bristol Pa., USA) and identified as product number MO16531 200 DC PE/AL/CRC. The preferred metallization layer 24 is aluminum and the protective coating 26 is believed to be a polyester or acrylic resin-based lacquer that may contain ultraviolet inhibitors. Such lacquers are believed to be disclosed in U.S. Pat. No. 4,353,766 to Dani, the contents of which are incorporated herein by reference. Other combinations of metallization and protective coatings are also within the scope of the invention if capable of providing a low emissivity of 0.05 or less desired for the facer sheet 20, and inhibiting any significant degradation of the emissivity over time after the insulation material 40 is installed on the duct 10.

When the insulation material 40 is installed on the interior and/or exterior wall surfaces of the duct 10, the nonwoven lofted fiber substrate 30 provides both excellent sound attenuation and thermal resistance properties that meet the requirements of a variety of HVAC duct applications. Furthermore, when the insulation material 40 is used as an internal HVAC duct liner, the facer sheet 20 provides a very smooth surface to reduce air resistance and provide a cleanable surface. If the insulation material 40 is used as external HVAC duct wrap and/or as an exterior sound and thermal blanket, the facer sheet 20 provides a vapor barrier and, when facing an air space or gap as discussed above, provides additional thermal resistance. Other potential applications include thermal and sound barriers for automotive applications. By varying the thickness of the nonwoven lofted fibers of the substrate 30 with the low emissivity metallized film facer sheet 20, the insulation material 40 can also be used as thermal insulation in residential and commercial constructions, particular in environments in which chemically sensitive people are present.

Any lamination process can be used to laminate the metallized facer sheet 20 to the nonwoven lofted fiber substrate 30. Manufacturing the insulation material 40 generally entails manufacturing the substrate 30 to an appropriate thickness and density to yield the desired thermal and sound transmission properties for the intended application, and then laminating the metallized facer sheet 20 to at least one surface of the substrate 30 using a suitable adhesive (not shown) to achieve properties that will meet industry required testing standards. Suitable adhesives for this purpose include water-based and solvent-based adhesives that contain a fire retardant or otherwise do not contribute to flame spread or smoke in accordance with the fire rating system of ASTM E 84 entitled "Test Method for Surface Burning Characteristics," to achieve a Class A fire rating per this standard.

While the invention has been described in terms of a preferred embodiment, it is apparent that other forms could be adopted by one skilled in the art. For example, the physical configuration of the insulation material 40 and its layers could differ from that shown, and materials and processes other than those noted could be used. Therefore, the scope of the invention is to be limited only by the following claims.

The invention claimed is:

1. A flexible insulation material installed on an HVAC duct defining an airflow passage therein, the flexible insulation material comprising:
   a substrate containing nonwoven lofted fibers, the flexible insulation material being attached to the duct such that a first surface of the substrate faces a wall surface of the duct; and
   a first facer sheet laminated to a second surface of the substrate oppositely disposed from the first surface thereof, the facer sheet comprising a polymeric film bonded to the substrate, a metallization layer on the polymeric film and separated from the substrate by the polymeric film, and optionally a corrosion-resistant protective coating on the metallization layer;
   wherein the flexible insulation material is secured to the duct and provides thermal insulation and sound attenuation properties, and the nonwoven lofted fibers of the substrate are contained between the first facer sheet and the wall surface of the duct to prevent the nonwoven lofted fibers from being released from the flexible insulation material.

2. The flexible insulation material according to claim 1, wherein the nonwoven lofted fibers of the substrate are polymeric fibers or cotton fibers.

3. The flexible insulation material according to claim 1, wherein the nonwoven lofted fibers of the substrate are polyethylene terephthalate fibers.

4. The flexible insulation material according to claim 1, wherein the polymeric film of the first facer sheet is a polyethylene terephthalate material.

5. The flexible insulation material according to claim 1, wherein the metallization layer is aluminum.

6. The flexible insulation material according to claim 1, wherein the protective coating on the metallization layer is chosen from the group consisting of polyester and acrylic-based lacquers.

7. The flexible insulation material according to claim 1, wherein the first surface of the substrate contacts the wall surface of the duct.

8. The flexible insulation material according to claim 7, wherein the wall surface of the duct is an interior wall surface of the duct, the flexible insulation material is within the airflow passage, and the nonwoven lofted fibers of the substrate are contained between the first facer sheet and the wall surface of the duct to prevent the nonwoven lofted fibers from being released into air moving through the airflow passage of the duct.

9. The flexible insulation material according to claim 1, wherein the wall surface of the duct is an exterior wall surface of the duct and the flexible insulation material surrounds the duct.

10. The flexible insulation material according to claim 9, wherein the metallization layer has an emissivity of 0.05 or less.

11. The flexible insulation material according to claim 10, wherein the metallization layer is protected by the protective coating.

12. The flexible insulation material according to claim 9, further comprising a second facer sheet laminated to the first surface of the substrate and constructed in accordance with the first facer sheet.

13. The flexible insulation material according to claim 12, wherein the metallization layer of the second facer sheet has an emissivity of 0.05 or less.

14. The flexible insulation material according to claim 13, wherein the metallization layer of the second facer sheet is protected by the protective coating.

15. A flexible insulation material surrounding an HVAC duct defining an airflow passage therein, the flexible insulation material comprising:
    a substrate containing nonwoven lofted fibers, the flexible insulation material being attached to the duct such that a first surface of the substrate faces an exterior wall surface of the duct; and
    first and second facer sheets laminated to, respectively, the first surface of the substrate and a second surface of the substrate oppositely disposed from the first surface, wherein the first facer sheet faces the exterior wall surface of the duct and is spaced apart from the duct to define a substantially continuous air gap therebetween, each of the first and second facer sheets comprising a polymeric film bonded to the substrate, a metallization layer on the polymeric film and separated from the substrate by the polymeric film, and optionally a corrosion-resistant protective coating on the metallization layer;
    wherein the flexible insulation material is secured to the duct and provides thermal insulation and sound attenuation properties, and the nonwoven lofted fibers of the substrate are contained between the first and second facer sheets to prevent the nonwoven lofted fibers from being released from the flexible insulation material.

16. A method comprising securing the flexible insulation material to the duct of claim 1 to provide thermal insulation and sound attenuation properties.

17. The method according to claim 16, wherein the wall surface of the duct is an interior wall surface of the duct, the flexible insulation material is secured within the airflow passage, and the nonwoven lofted fibers of the substrate are contained between the first facer sheet and the wall surface of the duct to prevent the nonwoven lofted fibers from being released into air moving through the airflow passage of the duct.

18. A method of providing thermal insulation and sound attenuation properties to an HVAC duct defining an airflow passage therein, the method comprising:
    providing a flexible insulation material that comprises a substrate containing nonwoven lofted fibers, and a first facer sheet laminated to a second surface of the substrate oppositely disposed from the first surface thereof, the facer sheet comprising a polymeric film bonded to the substrate, a metallization layer on the polymeric film and separated from the substrate by the polymeric film, and optionally a corrosion-resistant protective coating on the metallization layer; and
    securing the flexible insulation material to surround the duct so that a first surface of the substrate faces an exterior wall surface of the duct, the nonwoven lofted fibers of the substrate are contained between the first facer sheet and the wall surface of the duct to prevent the nonwoven lofted fibers from being released from the flexible insulation material, and the flexible insulation material is spaced apart from the duct to define a substantially continuous air gap therebetween.

19. The method according to claim 18, wherein the flexible insulation material further comprises a second facer sheet laminated to the first surface of the substrate and constructed in accordance with the first facer sheet.

* * * * *